Patented Oct. 21, 1930

1,779,287

UNITED STATES PATENT OFFICE

JOHANN KONRAD PFAFF AND KURT BÖTTGER, OF UETZE, AND ADOLF SIEWEKE, OF DOLLBERGEN, GERMANY, ASSIGNORS TO DEUTSCHE GASOLIN AKTIENGESELLSCHAFT, OF BERLIN-SCHONEBERG, GERMANY

PROCESS FOR THE SEPARATION OF FATTY OR WAXLIKE BODIES FROM THEIR SOLUTIONS

No Drawing. Application filed July 2, 1929, Serial No. 375,573, and in Germany May 16, 1927.

When precipitates which are formed when solutions are cooled, crystallize badly or not at all, it is often almost impossible in practice to separate them from the solvent. For example paraffin often precipitates in a greasy, non-filterable form from viscous mineral oils which may be considered as solvents for paraffin. Filtration is very difficult also when an attempt is made to obtain refined Montan wax by cooling and filtration from the distillate formed in the distillation of Montan wax.

It has been found that the said substances when precipitating from their solutions, pass into a readily filterable form if a second readily crystallizing body soluble in the same solvent is caused to precipitate simultaneously with the non-filterable body formed by cooling, which second body is precipitated in such a considerable quantity that the good crystalline structure of the added substance imparts a crystalline character to the body originally contained in the solution. Experiments have shown that about the same amount by weight is required of the easily crystallizing body as of the badly crystallizing or greasy substance precipitated.

The new process is fundamentally different from the known seeding of solution with well-formed crystals. Above all there need be no chemical affinity between the type of body precipitated and the added substance. Naphthalene is a particularly suitable addition. If this substance is used as addition for instance in the formation of paraffin crystals, there can be no question of "seeding". Whereas in seeding it is also necessary to allow the crystallization to proceed very slowly, the paraffin mass treated with naphthalene can be cooled very rapidly without the filterability of the precipitating mixture of naphthalene and paraffin being affected. On the contrary too slow a cooling is not advisable with the new process, because then the naphthalene crystals become large-surfaced and the grain of the precipitating mixture is affected and thus the capacity for being filtered.

The decisive factor in selecting the added agent is on the one hand its crystallizing capacity which should be as good as possible, and on the other hand its other properties, such as more especially its behaviour when measures are applied for its subsequent separation from the precipitate. In the said example of the separation of badly crystallizing paraffin by the addition of naphthalene, the latter can be removed simply by distillation with or without direct steam and with or without the use of a vacuum from the precipitated mixture and be used again for a subsequent similar operation.

Examples 1. 70 kgs. of a machine oil distillate containing 12% paraffin are diluted with 30 kgs. petroleum distillate, boiling point 200–240° C. and treated with 10 kgs. crystallized naphthalene while hot. Upon cooling to −15° C. paraffin and naphthalene precipitate in a granular, easily filterable form. Upon filtering in a filter press, which can be carried out without any difficulty, a good 30 kgs. filter cake and 100 kgs. clear filtrate are obtained. Filter cake and filtrate are each freed from petroleum and naphthalene in a vacuum at 120° C., steam being blown in. There are obtained as final products about 60 kgs. of a machine oil distillate which still remains clear even at −10° C. without precipitating paraffin, and about 10 kgs. vaseline-like paraffin, solidifying at 38° C.

If desired the cake, for the purpose of removing a further amount of oil, can be dissolved again prior to the blowing off, in 30 kgs. fresh petroleum as solvent, cooled and again filtered, in which case the filtrate can be used as solvent for the next charge to be freed from paraffin. After the expulsion of petroleum and naphthalene from the filter cake, a substantially harder vaseline is obtained, solidifying at 45° C.

2. 40 flgs. of the product obtained by refining cylinder oil solidifying at 25° C. are dissolved in 50 kgs. petroleum with the addition of 10 kgs. naphthalene at 30° C. It is cooled to −15° C. and filtered through a filter press. From the filtrate there is obtained by expelling naphthalene and petroleum 30 kgs. refined cylinder oil solidifying at −10° C., whereas the filter cake treated in a similar way yields 10 kgs. vaseline solidifying at 40° C.

3. 10 kgs. vacuum-steam-distillate from crude Montan wax, solidifying at 30° C. are dissolved in a quantity of a mixture of alcohol and benzene such that a solution which is clear at 30° C. is formed, then treated with 7 kgs. naphthalene and the mixture cooled to 0° C. Upon filtration about 15 kgs. of a solid filter cake is obtained, which is leached out several times with initially cooled alcohol-benzene, and finally with pure alcohol. After alcohol and naphthalene have been expelled by steam, at the end with the use of a vacuum, there is obtained from the filter cake a refined Montan wax product, of very slight odour, which can easily be decolorized with decolorizing powder and solidifies at about 75–80° C. Alcohol, benzene and naphthalene can be recovered by distillation from the filter outlet and the washing liquors. Preferably the original distillation of the Montan wax is conducted by fractional cooling in such a way that the distillate to be filtered contains no constituents boiling under 250° C.

For carrying out the process use may also be made of other additions which crystallize well, instead of naphthalene. Mention may be made for instance of anthracene, phenanthrene, p-dichlorbenzene, p-dibrombenzene. Naphthalene has of course the special advantage, that it is inexpensive and can always be easily procured, has a melting point of about 60–90° C., so that it can easily be melted up with steam, also is sufficiently soluble in lubricating oils and has a small specific gravity, so that it can be readily separated from condensed water together with the solvent.

What we claim is:

1. A process for separating wax-like bodies, such as soft wax (petroleum jelly), paraffin wax and Montan wax, from solutions of the same in petroleum distillates, Montan wax distillates and similar distillates, and organic solvents, consisting in dissolving in the said solutions of wax-like bodies, while hot, an amount by weight approximately equal to that of the said wax-like bodies to be separated of a substance which crystallizes well, and is soluble in the same solvent but differs chemically from the wax-like bodies being separated, cooling the resulting solution to at least 0° C., whereby simultaneous precipitation of the wax-like bodies and the added substance is effected, removing the solvent by filtration, and separating the precipitated mixture into the added substance and the said wax-like bodies by distillation, as set forth.

2. A process for separating wax-like bodies, such as soft wax (petroleum jelly), paraffin wax and Montan wax, from solutions of the same in petroleum distillates, Montan wax distillates and similar distillates, and organic solvents, consisting in dissolving in the said solutions of wax-like bodies, while hot, an amount by weight of naphthalene approximately equal to the amount by weight of the said wax-like bodies to be separated, cooling the resulting solution to at least 0° C., whereby simultaneous precipitation of the wax-like bodies and the naphthalene is effected, removing the solvent by filtration, and separating the precipitated mixture into naphthalene and the said wax-like bodies by distillation, as set forth.

In testimony whereof we have signed our names to this specification.

JOHANN KONRAD PFAFF.
KURT BÖTTGER.
ADOLF SIEWEKE.